United States Patent
Hyland et al.

(10) Patent No.: US 6,671,824 B1
(45) Date of Patent: Dec. 30, 2003

(54) CABLE NETWORK REPAIR CONTROL SYSTEM

(75) Inventors: James Hyland, Dungarvan (IE); Eileen Hyland, Dungarvan (IE)

(73) Assignee: Lakefield Technologies Group, Dungarvan (IE)

( * ) Notice: Subject to any disclaimer, the term of this patent is extended or adjusted under 35 U.S.C. 154(b) by 0 days.

(21) Appl. No.: 09/539,510

(22) Filed: Mar. 30, 2000

(30) Foreign Application Priority Data

Apr. 19, 1999 (IE) ................................................ 990325

(51) Int. Cl.$^7$ ............................................... G06F 11/00
(52) U.S. Cl. ........................ 714/26; 714/47; 379/9.03; 379/9.04; 379/133; 705/9
(58) Field of Search ................... 714/26, 47; 379/133, 379/9.02, 9.03, 9.04, 9.05; 705/8, 9

(56) References Cited

U.S. PATENT DOCUMENTS

| | | | | |
|---|---|---|---|---|
| 4,464,543 A | * | 8/1984 | Kline et al. | 379/224 |
| 4,649,515 A | * | 3/1987 | Thompson et al. | 706/52 |
| 5,159,685 A | | 10/1992 | Kung | 395/575 |
| 5,293,585 A | | 3/1994 | Morita | 395/52 |
| 5,483,637 A | * | 1/1996 | Winokur et al. | 714/26 |
| 5,568,491 A | * | 10/1996 | Beal et al. | 714/746 |
| 5,687,212 A | * | 11/1997 | Kinser et al. | 379/9.03 |
| 5,761,502 A | * | 6/1998 | Jacobs | 707/103 R |
| 5,920,846 A | * | 7/1999 | Storch et al. | 705/7 |
| 5,953,389 A | * | 9/1999 | Pruett et al. | 379/9 |
| 6,198,914 B1 | * | 3/2001 | Saegusa | 455/404 |
| 6,219,648 B1 | * | 4/2001 | Jones et al. | 705/8 |
| 6,389,426 B1 | * | 5/2002 | Turnbull et al. | 707/102 |
| 6,445,774 B1 | * | 9/2002 | Kidder et al. | 379/9.03 |

FOREIGN PATENT DOCUMENTS

| | | | |
|---|---|---|---|
| EP | 0788049 | 8/1997 | |
| EP | 0792032 | 8/1997 | |
| EP | 0792032 A1 | * 8/1997 | ........... H04B/10/08 |
| WO | WO98/57286 | 12/1798 | |

* cited by examiner

Primary Examiner—Robert Beausoliel
Assistant Examiner—Marc M Duncan
(74) Attorney, Agent, or Firm—Jacobson Holman PLLC (57) ABSTRACT

A cable network repair control system including a server communicating with multiple call-handling clients in a trouble call center. The databases are used to automatically determine an associated network device for the customer who makes a trouble call. When a second call is received for a particular network device, an inferencing engine automatically operates to identify potential repairs crews and to control communication with them to ensure that optimum use of the repair crew time and quick repair. Various tables are generated dynamically and are used to update management status tables for reviewing of network repair status.

16 Claims, 7 Drawing Sheets

Respond2 - [Job Information]

File  Edit                                                                                    Help

| Local Office | Raised Norm | Raised SL | Allocated Norm | Allocated SL | Issued NORM | Issued SL | Repair | GS1 | GS2 | Faults | Planned Interruptions |
|---|---|---|---|---|---|---|---|---|---|---|---|
| 11 CAMBRIDGE | 7 | | | | 0 | | 2 | 0 | 6 | 1 | 0 |
| 12 BEDFORD | 4 | | 1 | | | | | 4 | 1 | 0 | 1 |
| 13 HEMEL HEMPSTEAD | 1 | | 1 | | 0 | | | 1 | 1 | 0 | 0 |
| 14 LUTON | 13 | 0 | | | | | | 5 | 8 | 1 | 0 |
| 15 PINNER | 1 | | | | | | | | 1 | 0 | 0 |
| 16 PETERBOROUGH | 2 | | 1 | | | | 1 | | 2 | 1 | 0 |
| 19 AYLESBURY | 6 | | | | | | 1 | 3 | 3 | 1 | 0 |
| 22 CHELMSFORD | 5 | | | | | | 1 | 1 | 2 | 0 | 0 |
| 24 HAROLD HILL | 112 | | 13 | | 12 | 1 | 13 | 86 | 24 | 5 | 1 |
| 25 RAYLEIGH | 5 | | 1 | | 1 | 1 | 1 | 1 | 1 | 0 | 0 |
| 34 CLACTON | 5 | | | | 1 | | | | 5 | 1 | 1 |
| 44 KINGS LYNN | 3 | | 1 | | | | 1 | 1 | 3 | 1 | 0 |
| 45 BROADLAND | 1 | | | | | | | 0 | 1 | 0 | 1 |
| 46 NORWICH | 2 | | | | | | | | 2 | 1 | 0 |
| 55 HARLOW | 1 | | 2 | | 0 | | | 1 | 1 | 0 | 0 |
| 57 ST. ALBANS | 6 | | 2 | | | | | 2 | 6 | 2 | 1 |
| 58 STEVENAGE | 5 | | | | | | | | 5 | 0 | 0 |
| 71 IPSWITCH | 2 | | 1 | | | | | 2 | 1 | 0 | 0 |
| 74 BURY ST EDMUNDS | | | | | | | 1 | | 1 | 0 | 0 |
| 81 BOREHAMWOOD | 1 | | | | | | | | | 0 | 0 |
| 83 ENFIELD | 11 | | | | | | | | 11 | 0 | 0 |
| Totals: | 193 | 0 | 23 | 0 | 14 | 2 | 21 | 187 | 85 | 14 | 4 |

Enter value for : ALLOCATED
Count *21

Buttons: OK, Cancel, Fault List, GS1 List, GS2 List, Fax Instrs, Alarms, Interruptions

Fig. 4

| | Respond2 -[Acknowledge User Alarms] | | | | |
|---|---|---|---|---|---|
| File  Edit | | | | Help | |
| Job No | Date And Time Raised | Local Office | | User ID | |
| | 10-APR-1999 00:00 | 14 | LUTON | ORSONP | |
| 3511000332 | 26-MAY-1998 15:50 | 11 | CAMBRIDGE | ORSONP | |
| 3524000188 | 19-MAY-1998 09:11 | 24 | HAROLD HILL | ORSONP | |
| 3524000188 | 19-MAY-09:11 | 24 | HAROLD HILL | ORSONP | |
| 3524000164 | 18-MAY-1998 11:00 | 24 | HAROLD HILL | ORSONP | |
| 3512000062 | 05-MAY-1998 10:18 | 12 | BEDFORD | ORSONP | |
| 3516000001 | 05-MAY-1998 10:18 | 16 | PETERBOROUGH | ORSONP | |
| 3524000158 | 05-MAY-1998 10:18 | 24 | HAROLD HILL | ORSONP | |
| 3524000206 | 05-MAY-1998 10:18 | 24 | HAROLD HILL | ORSONP | |
| 3524000059 | 05-MAY-1998 10:18 | 24 | HAROLD HILL | ORSONP | |
| 3513000091 | 05-MAY-1998 10:18 | 57 | ST.ALBANS | ORSONP | |
| 3524000165 | 05-MAY-1998 10:18 | 24 | HAROLD HILL | ORSONP | |
| 3524000312 | 05-MAY-1998 10:18 | 24 | HAROLD HILL | ORSONP | |
| 3524000374 | 05-MAY-1998 10:18 | 24 | HAROLD HILL | ORSONP | |
| 3524000295 | 05-MAY-1998 10:18 | 24 | HAROLD HILL | ORSONP | |

Buttons: OK, Job Details, Fault Details, Call Details, Acknowledge, View P1

Fig. 5

| | Respond2 -[GS2 Job List] | | | | | | |
|---|---|---|---|---|---|---|---|
| File  Edit | | | | | | Help | |
| Duration | Time Off Job No. | Supply | LD. | SL | Address 1 | Address 2 | |
| 12:11 | 3544000024 | 01:15 | 44 | S | TX 10007 | HV DEVICE 1000 | |
| 4:11 | 3548000029 | 09:15 | 45 | R | 16 FOOT BANK P6 | ELWYNCOURT | |
| 0 | 3525000001 | | 25 | 1 | TX 6770 | HV Device 6767 | |

Buttons: OK, Cancel, Fault Details, Job Details, Place on GS1, Delete from GS2, Job Search

Fig. 6

CABLE NETWORK REPAIR CONTROL SYSTEM

FIELD OF THE INVENTION

The invention relates to a cable network repair control system comprising means for receiving data arising from trouble calls reporting faults in a cable network system such as an electrical distribution system.

PRIOR ART DISCUSSION

Heretofore, such systems have been quite passive in their operation and there has been little integration with the network itself and with resources for repairing the faults which arise.

OBJECTS OF THE INVENTION

It is therefore an object of the invention to provide a cable network repair control system which allows trouble calls to be taken and to be analysed.

Another object is that the system assists with location of faults to reduce the average time between taking a trouble call and the fault being repaired.

A still further object is that the system provide for tracking and management of field resources.

SUMMARY OF THE INVENTION

According to the invention, there is provided a cable network repair control system comprising a data storage device, a processor, and a plurality of trouble call reception terminals, wherein the processor comprises:
  means for maintaining in a customer database an identifier of a network device associated with each customer,
  means for automatically determining an associated network device in response to a customer off-supply trouble call,
  means for maintaining an off-supply network device dataset of associated network devices for current customer trouble calls,
  an inference engine comprising means for processing data from the off-supply network device dataset, network device failure probability data, and network connectivity data as input parameter values to automatically infer which network devices are faulty, and
  job control means for generating a job record in a job dataset for repair of a network device inferred as being faulty.

In one embodiment, the inference engine comprises means for automatically operating in response to receipt of a subsequent trouble call associated with a particular network device.

Preferably, the system comprises means for maintaining a call dataset of current trouble calls, and for interrogating said dataset to determine if a call is a subsequent call.

In another embodiment, the inference engine comprises means for processing environmental condition data as input parameter values.

In a further embodiment, the inference engine comprises means for applying the input parameter values as weighted factors.

In one embodiment, the inference engine comprises means for performing interactive voice processing to:
  automatically identify customers affected by a fault;
  select customers according to network connectivity and poll the selected customers to determine if they are still off-supply, and
  feed the poll response data back as input parameter values.

Preferably, the polling means comprises an interactive voice processor for automatically transmitting a voice message requesting a response indicating if the customer is still off-supply.

In a further embodiment, the system further comprises a resource control engine comprising means for allocating a job by determining an appropriate repair resource using resource data and vehicle position data as input parameters.

Preferably, the resource control engine comprises means for interpreting vehicle position data embedded in GPS signals.

In another embodiment, the job control means comprises means for transmitting a repair instruction to a resource using radiation signals to issue a job.

In a further embodiment, the job control means comprises means for updating an assignment dataset comprising records storing for each repair job a job identifier, a resource identifier, and a flag indicating whether the job is allocated.

In a further embodiment, the system further comprises a reporting module comprising means for dynamically maintaining a network repair status table drawing data from the call dataset, the job dataset, and the assignment dataset, the status table indicating number of allocated and issued repair jobs on a regional basis.

Preferably, the system stores a dataset indicating a grid reference for each network device, and the customer database includes a grid reference for each customer. In a further embodiment, the reporting module comprises means for using grid reference data to group jobs on a regional basis.

In another embodiment, the reporting module comprises means for monitoring real time and for generating alerts for jobs according to time duration since a trouble call was received.

Preferably, the reporting module comprises means for automatically generating a table of more detailed report data in response to a query.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:

FIGS. 2(*a*), 2(*b*), and 2(*c*) are together a flow diagram illustrating operation of the system;

DESCRIPTION OF THE EMBODIMENTS

Figure 1:
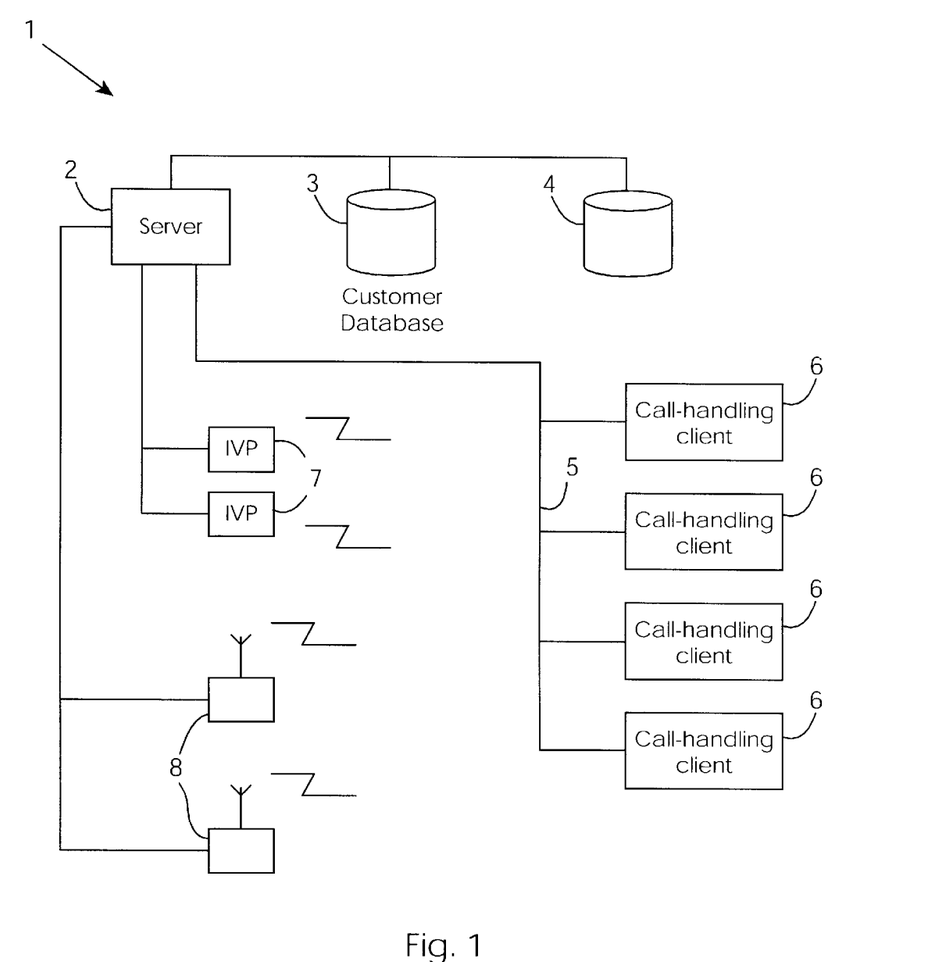
FIG. 1 is a schematic representation of a cable network repair control system of the invention.

Referring initially to FIG. 1, a cable network repair control system 1 of the invention is illustrated. The system 1 comprises a server 2 which is connected to a customer database 3 and to a database 4 of repair control tables. These databases are typically many Giga bytes in size as they are required to have data relating to at least 100,000 customers and in some instances a number which is orders of magnitude greater. The server 2 is connected by a network 5 to call handling clients 6 which are used by personnel in a call centre for taking trouble calls from customers and accessing the server 2. Interactive voice processors 7 are connected to the server 2 on one side and to a telephone network on the other. Finally, the server 2 comprises radio transmitters/receivers 8 for wireless communication.

The databases 3 and 4 have approximately 250 tables which are highly integrated with referential integrity.

Figure 2A:
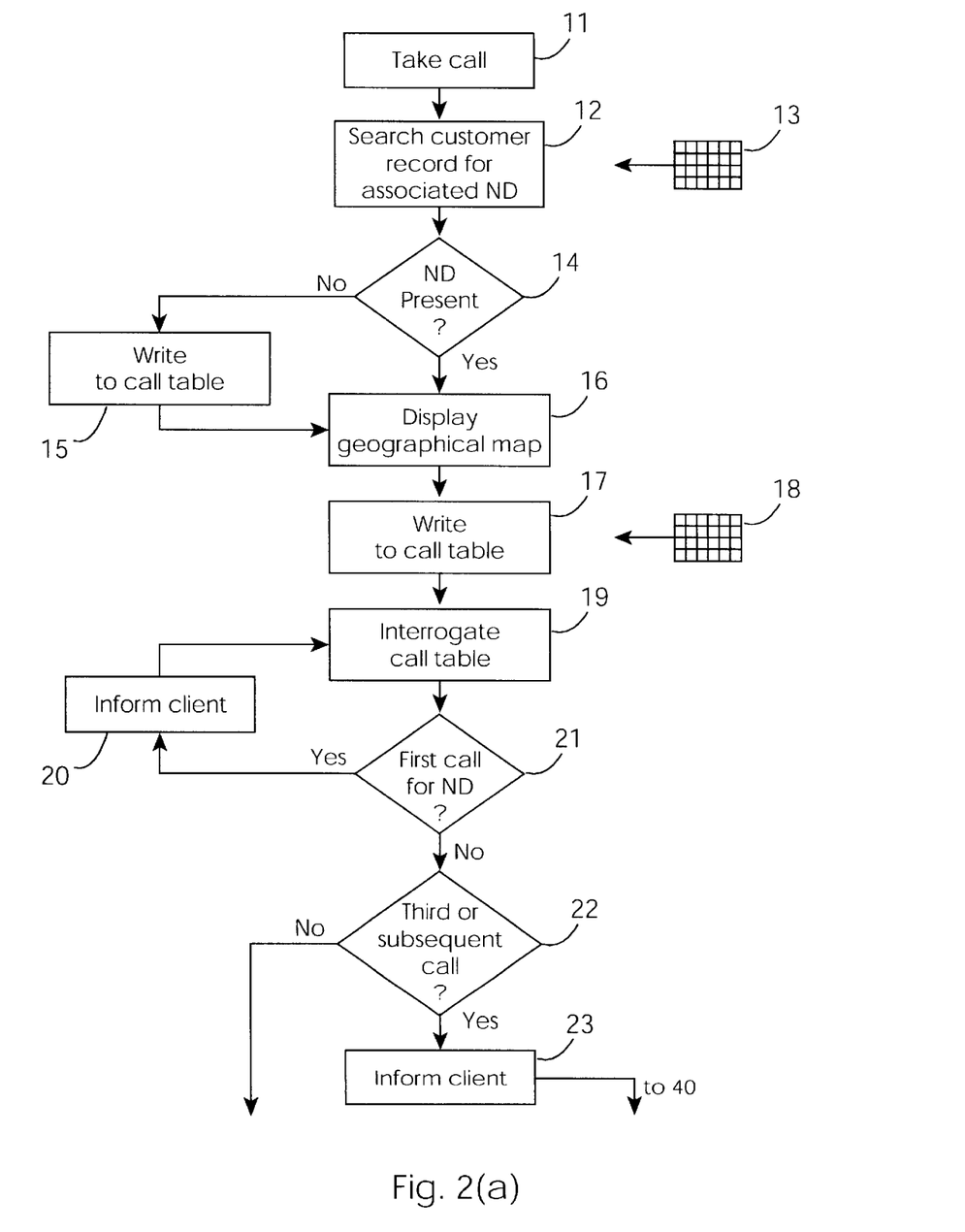
Figure 2B:
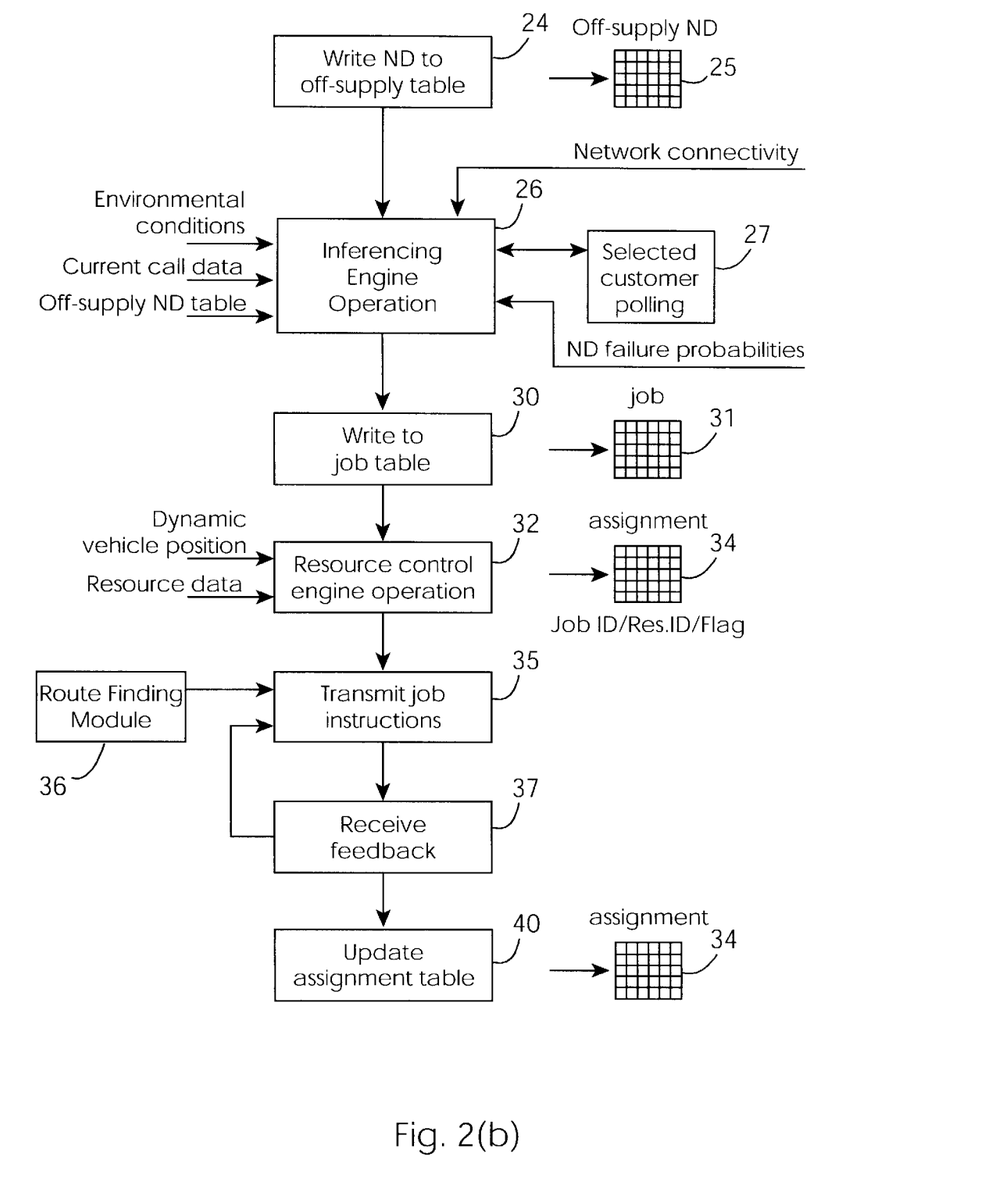
Figure 2C:
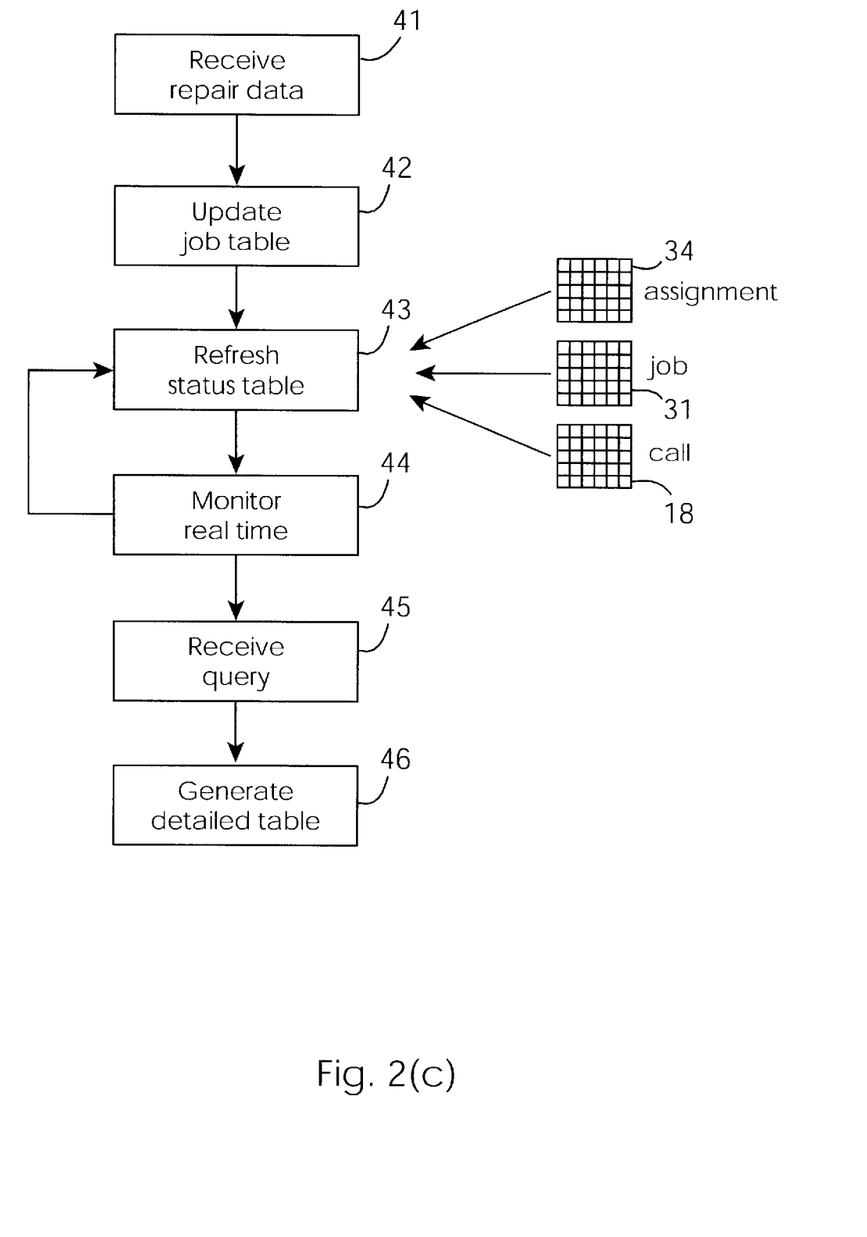

Referring now to the remaining drawings, an overall method of operation of the system 1 is indicated by the flow diagram of FIGS. 2(*a*) to 2(*c*). This illustrates the manner in which the server 2 and the clients 6 are programmed for network repair control. In step 11 a call is taken by an operator handling the calls and using one of the call-handling clients 6. Upon keying in data provided by the customer, the server 2 in step 12 retrieves a customer record and within this record reads an identifier for an associated network device (ND). The customer record is retrieved from a customer table 13 within the customer database 3. The associated ND is typically the closest network device. Data regarding the associated NDs is built up over time using data which is fed back. In addition, however, it is also generated in a batch process by calculating geographical (physical) distance between the customer premises and nearby NDs using the grid references for them. If, however, the ND identifier is not present in the customer record, as indicated by the decision step 14, this is dynamically computed in step 15 with triangulation using the grid references.

In step 16 a geographical map indicating the location of the customer and the associated ND is displayed. This is of benefit to the operator in discussing the off-supply situation with the caller.

In step 17, data relating to the call is written to a call table 18 which retains a record for all current trouble calls. In step 19, the call table 18 is interrogated to determine if the same ND is present in another record, as indicated by the decision step 21. If not present, then it is the first call relating to that ND and the client 6 is informed in step 20. In response to this, the operator may tell the caller that the situation is being reviewed and that it is possible that the problem lies within the caller's premises. However, if the call is the third or subsequent call, as indicated by the decision step 22, no immediate action is required because the fault is already being dealt with. The client 6 is informed and the operator tells the caller in step 23.

The only remaining possibility is that the call is the second call for the particular ND and in step 24 the identifier for the ND is written to an off-supply ND table 25. This table stores an identifier of all NDs which are associated with customers who are off-supply. However, not all of these NDs are faulty as the fault could lie in an up-stream node of the cable network.

In step 26, an inferencing engine of the server 2 automatically processes the following input parameters in order to infer which network device is faulty. The network device may not be included in the off-supply ND table 25 as it may be an up-stream node away from customer premises.

Environmental conditions such as geographical location of a recent lightning strike.
Current call data inputted by the operator.
The off-supply ND table 25.
ND failure probabilities relating to the nature of the ND. For example, overhead cable has a higher failure probability than underground cable.
Data representing ND connectivity to define the network.
For example, the input parameters for use by the inferencing engine 26 are weighted scale values representing conditions such as the following.

If recent lightning is indicated, upstream protection devices will be inferred as opposed to individual transformers.
If recent flooding is indicated in an underground network, individual transformers will be inferred as opposed to upstream protection devices.
Network devices records store indicators which relate to the likelihood of them faulting. Those network devices considered unlikely to fault will not be inferred initially. However, they may be inferred subsequent to IVP/IVR based feedback, as described below.

An important aspect of operation of the inferencing engine 26 is that in step 27 it uses the IVPs 7 to poll selected customers which are supplied by an ND which is identified as being possibly faulty. The telephone number is dialled by the relevant IVP 7, a message is automatically transmitted requesting the customer who answered to press certain keys on the telephone to indicate if he or she is off-supply. The results are fed back into the inferencing engine 26 to assist in determining the most likely faulty ND.

In more detail, the system "walks" the network hierarchy based on "load flow" calculations in order to locate a protection device upstream of the trouble calls. The system retrieves the telephone numbers of customers associated with the first transformer downstream of that device. The numbers are auto-called via IVP/IVR and a pre-recorded voice recording is played which requests the user to use the telephone to respond to the pre-recorded messages. For example, the following message may be played automatically:

"Hello, this is an automatic voice telephone call from the electricity company. We wish you to assist us in providing fast repair to your local supply network. Can you please indicate if your property is currently receiving power. If you are currently receiving no power, please press one after the tone, otherwise please hang up or press 9 to speak to an electricity company representative".

Specialised IVP/IVR software determines if there is an electricity company agent available to take the call be fore initiating the IVP/IVR auto-dialing. If the customer presses "1" on their telephone, the system will update "walks" in the network hierarchy to find the upstream device and repeat the process until the first on supply device is found. Once the first faulty upstream device is found, the system "walks" the network in the opposite direction to find the first off supply transformer via customer IVP/IVR based feedback. The inference engine will indicate a fault at this location.

In step 30, the output of the inferencing engine 26 is used to update a job table 31 which stores a link for each faulty ND which needs to be repaired. The table 31 is updated regularly using current repair data.

In step 32 a resource control engine receives dynamic vehicle position data which is received via the GPS system at the radio transmitters/receivers 8. Also, data representing the repair resources is also inputted. This data represents the available repair crews who are in the field and the type of work which they can do. The resource data (including resource location) is compared using triangulation to outstanding, un-issued, job locations in order that the system automatically allocates the jobs to the most suitable resource without involving manual effort at resource control. This greatly reduces the effort at resource control and dispatch centres. Furthermore, the resources are informed of these allocations using in-vehicle computers. Acceptance, or otherwise, of the workload can be entered by them in their vehicles, thereby negating the requirement for voice communication with resource control and dramatically improving the movement of information. The parameters associated with this auto-allocation include:

the quantity of work a resource has at present,
  how many emergency jobs are associated with the resource,
  the skills associated with the resource,
  the proximity of the resource to the job,
  the workload of the resource compared to other resources in the vicinity, and
  the time the resource comes off shift compared to other resources in the vicinity.

Once a resource is identified, an assignment table 34 is updated. Each record of the table 34 has a job identifier, a resource identifier, and a flag indicating whether or not the job has been issued. In step 36 a job instruction is transmitted using the radio transmitter/receiver 8 and feedback may be received in step 37 as to the availability of the resources to do the repair job. A route finding module 36 is used to select resources, the current position of which is known from the GPS system. Depending on the communication with the resources, in step 40 the assignment table 34 is updated and more particularly the flag in the record is updated to indicate if the job has been issued.

In step 41 the repair data is received by the server 2 and is used in step 42 to update the job table 31. These steps are of course carried out in parallel with the previous steps and it is for clarity that they are shown in sequence. This data is used to update a main status table in step 43. An illustration of parts of the status table is given in FIG. 4. This table draws data from the assignment table 34, the job table 31, and the call table 18. It generates a row for each geographical region covered by the cable network and these regions are defined by the grid references. The first column after the region name indicates the total number of job table entries for that region. The column "SL" means "street light" oriented jobs.

Figure 4:
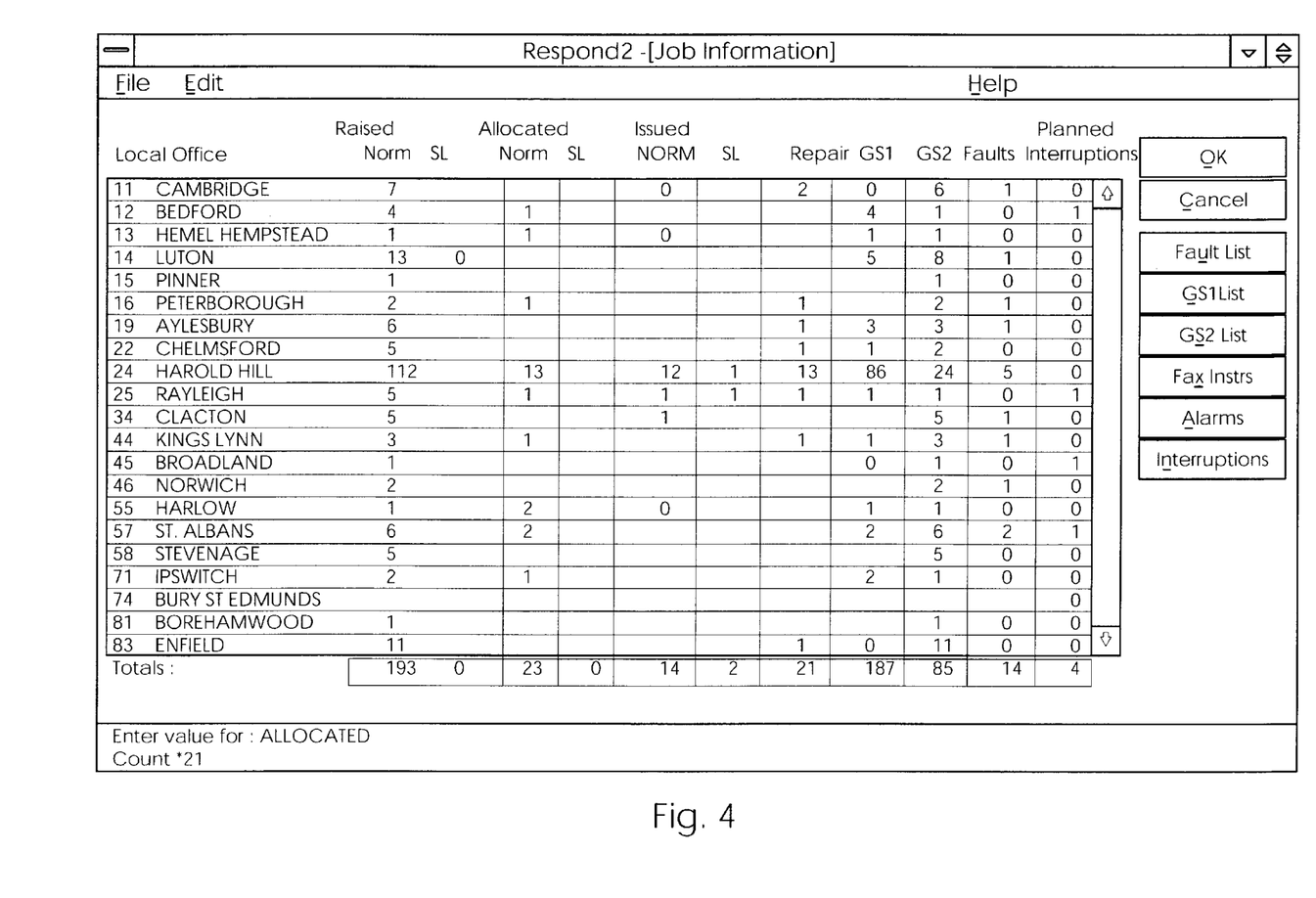
FIGS. 4, 5, and 6 are representations of display screens generated by the system.

The next four columns indicate numbers of jobs which have been allocated and which have been issued. The "Repair" column provides data for medium term repair work, as opposed to emergency work.

The "GS1" and "GS2" columns indicate the number of jobs which have exceeded standard time limits set by the Guaranteed Standards GS1 and GS2 respectively. The utility will incur a penalty for customers being off-supply for periods greater than those specified by the standards. One such standard may relate to fuses in the network, while another relates to transformers. The server dynamically monitors real time and generates a warning if periods are exceeded. The "fault" column indicates the number of jobs which are considered part of a network fault, as opposed to a fault at a customer's premises. The final column indicates interruptions which are planned for the following time period.

Figure 5:
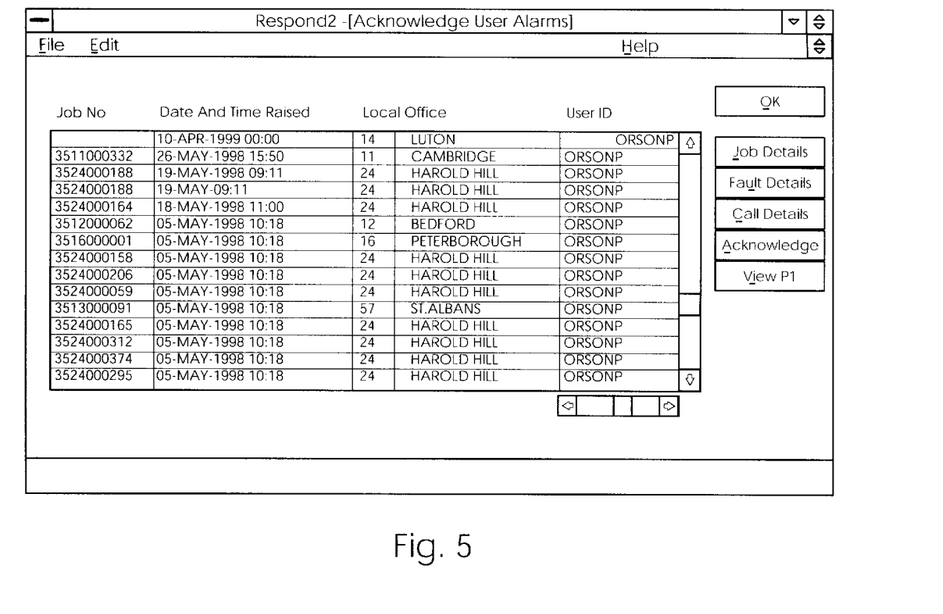
Figure 6:
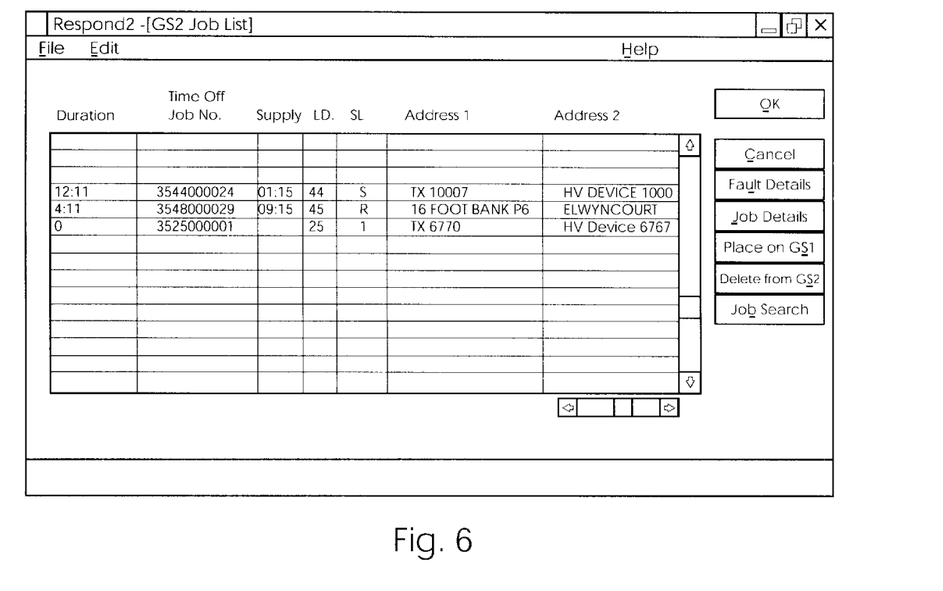

As shown in FIGS. 5 and 6, more information may be retrieved by generating a query, upon which the server automatically generates a more detailed table. For example in FIG. 5 a display is generated which provides additional detail for alarms associated with each job. FIG. 6 shows a table indicating the duration of a job according to time of supply. The job for the top row has lasted more than 24 hours and is signalled by a bright red colour. It will be appreciated that all of the data for the display table may be sourced in a simple manner from the three table, 18, 31, and 34. Additional data may also be provided from other tables such as one indicating planned interruptions. The information provides a highly valuable summary of network fault status and allows managers to immediately identify problems before they arise so that the necessary resources may be allocated. Obviously, it is a managers task to try to keep the number of unallocated jobs as low as possible.

Figure 3:
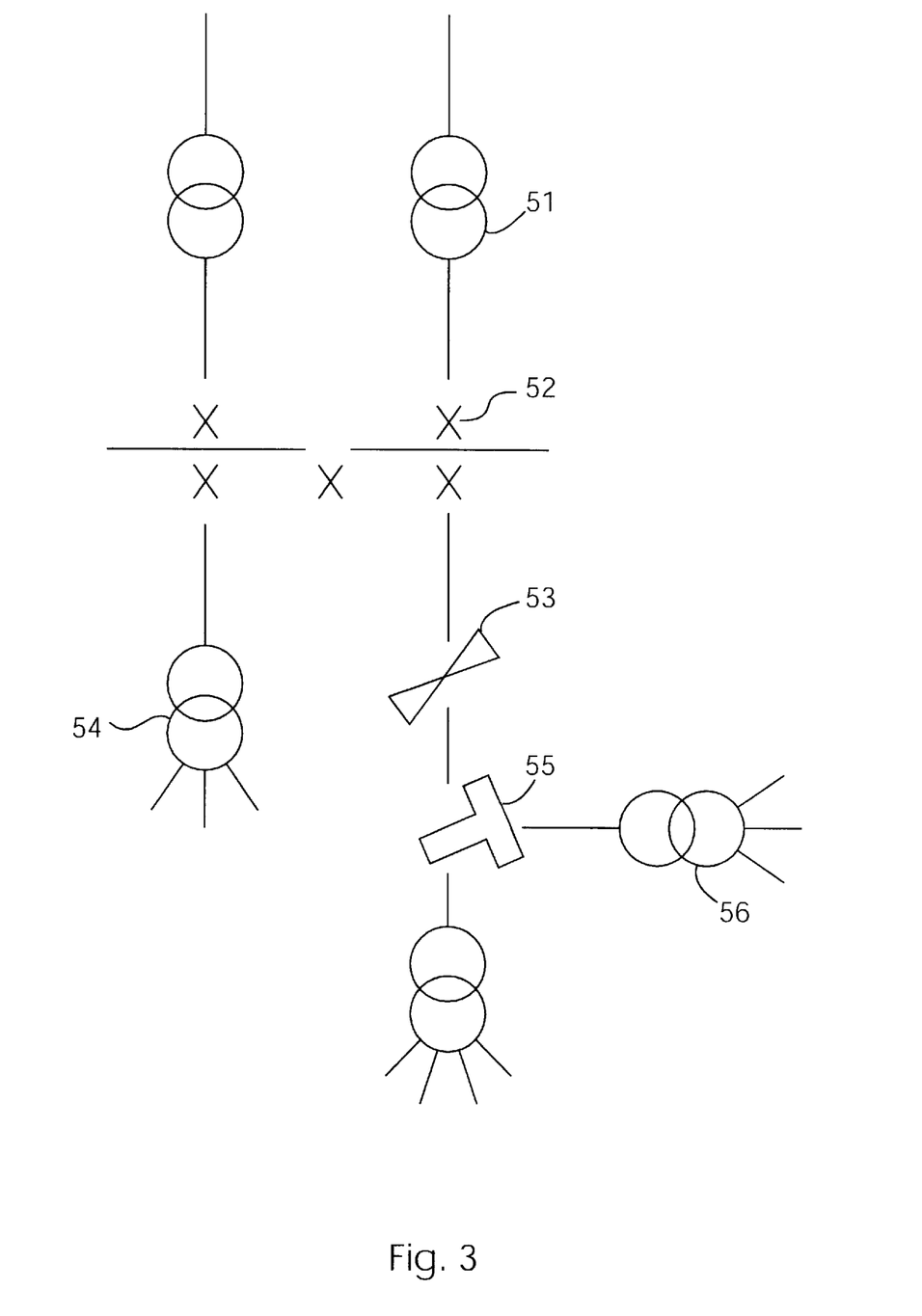
FIG. 3 is a diagrammatic representation of part of a transmission system.

Fault reports are also generated off-line to indicate for each ND the historical record of when it was off-supply and the nature of faults. FIG. 3 is a representation of part of a transmission network. It indicates how different network devices interact so that a fault in one may affect downstream devices. In this diagram, there are transformers 51, 54, 55, and 57, feeder circuit breakers 52, a fuse 53, and an auto recloser 55. It is important to keep a record of faults which arise in each of these types of devices because they are very different in characteristics and preventative maintenance plans need to be devised.

It will be appreciated that the invention provides comprehensive network repair control by allowing very quick identification of which network device is likely to be faulty for particular customers. It also provides for comprehensive communication with the repair crews and real time dynamic display of data to assist in management decision making.

The invention is not limited to the embodiments described but may be varied in construction and detail within the scope of the claims.

What is claimed is:

1. A cable network repair control system comprising a data storage device, processor, and a plurality of trouble call reception terminals, whereby the processor comprises:

means for maintaining in a customer database an identifier of a network device associated with each customer,
  means for automatically determining an associated network device in response to a customer off-supply trouble call,
  means for maintaining an off-supply network device dataset of associated network devices for current customer trouble calls,
  an inference engine comprising means for processing data from the off-supply network device dataset, network device failure probability data, and network connectivity data as input parameter values to automatically infer which network devices are faulty, and
  job control means for generating a job record in a job dataset for repair of a network device inferred as being faulty,
  the inference engine including means for processing environmental condition data as input parameter values.

2. The system as claimed in claim 1, wherein the inference engine comprising means for automatically operating in response to receipt of a subsequent trouble call associated with a particular network device.

3. The system as claimed in claim 2, wherein the system comprises means for maintaining a call dataset of current trouble calls, and for interrogating said dataset to determine if a call is a subsequent call.

4. The system as claimed in claim 1, wherein the inference engine comprises means for applying the input parameter values as weighted factors.

5. The system as claimed in claim 1, wherein the system further comprises a resource control engine comprising means for allocating a job by determining an appropriate repair resource using resource data and vehicle position data as input parameters.

6. The system as claimed in claim 5, wherein the resource control engine comprises means for interpreting vehicle position data embedded in GPS signals.

7. The system as claimed in claim 1, wherein the job control means comprises means for transmitting a repair instruction to a resource using radiation signals to issue a job.

8. The system as claimed in claim 1, wherein the system stores a dataset indicating a grid reference for each network device, and the customer database includes a grid reference for each customer.

9. A computer program product comprising software code portions on a computer readable medium for implementing the functions of the system claimed in claim 1 when run on a digital computer.

10. A cable network repair control system comprising a data storage device, processor, and a plurality of trouble call reception terminals, whereby the processor comprises:

means for maintaining in a customer database an identifier of a network device associated with each customer, means for automatically determining an associated network device in response to a customer off-supply trouble call, means for maintaining an off-supply network device dataset of associated network devices for current customer trouble calls, an inference engine comprising means for processing data from the off-supply network device dataset, network device failure probability data, and network connectivity data as input parameter values to automatically infer which network devices are faulty, and job control means for generating a job record in a job dataset for repair of a network device inferred as being faulty, the inference engine including means for performing interactive voice processing to:

automatically identify customers affected by a fault;

select customers according to network connectivity and poll the selected customers to determine if they are still off-supply; and feed the poll response data back as input parameter values.

11. The system as claimed in claim 10, wherein the polling means comprises an interactive voice processor for automatically transmitting a voice message requesting a response indicating if the customer is still off-supply.

12. A cable network repair control system comprising a data storage device, processor, and a plurality of trouble call reception terminals, whereby the processor comprises:

means for maintaining in a customer database an identifier of a network device associated with each customer, means for automatically determining an associated network device in response to a customer off-supply trouble call, means for maintaining an off-supply network device dataset of associated network devices for current customer trouble calls, an inference engine comprising means for processing data from the off-supply network device dataset, network device failure probability data, and network connectivity data as input parameter values to automatically infer which network devices are faulty, and job control means for generating a job record in a job dataset for repair of a network device inferred as being faulty, the job control means including means for updating an assignment dataset comprising records storing for each repair job a job identifier, a resource identifier, and a flag indicating whether the job is allocated.

13. A cable network repair control system comprising a data storage device, processor, and a plurality of trouble call reception terminals, whereby the processor comprises:

means for maintaining in a customer database an identifier of a network device associated with each customer, means for automatically determining an associated network device in response to a customer off-supply trouble call, means for maintaining an off-supply network device dataset of associated network devices for current customer trouble calls, an inference engine comprising means for processing data from the off-supply network device dataset, network device failure probability data, and network connectivity data as input parameter values to automatically infer which network devices are faulty, job control means for generating a job record in a job dataset for repair of a network device inferred as being faulty, and a reporting module comprising means for dynamically maintaining a network repair status table drawing data from the call dataset, the job dataset, and the assignment dataset, the status table indicating number of allocated and issued repair jobs on a regional basis.

14. The system as claimed in claim 13, wherein the reporting module comprises means for using grid reference data to group jobs on a regional basis.

15. The system as claimed in claim 13, wherein the reporting module comprises means for monitoring real time and for generating alerts for jobs according to time duration since a trouble call was received.

16. A The system as claimed in claim 13, wherein the reporting module comprises means for automatically generating a table of more detailed report data in response to a query.

* * * * *

UNITED STATES PATENT AND TRADEMARK OFFICE
CERTIFICATE OF CORRECTION

PATENT NO. : 6,671,824 B1
DATED : December 30, 2003
INVENTOR(S) : Hyland et al.

It is certified that error appears in the above-identified patent and that said Letters Patent is hereby corrected as shown below:

<u>Title page,</u>
Item [73], Assignee, please change "Lakefield Technologies Group" to
-- Lakefield ETechnologies Group Limited --.

Signed and Sealed this

Fourth Day of May, 2004

JON W. DUDAS
*Acting Director of the United States Patent and Trademark Office*